(12) United States Patent
Kim et al.

(10) Patent No.: US 8,517,156 B2
(45) Date of Patent: Aug. 27, 2013

(54) CLUTCH ACTUATING APPARATUS FOR TRANSMISSION

(75) Inventors: Jongyop Kim, Seoul (KR); Sungyong Cho, Hwaseong-si (KR); Hyunduk Chang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 480 days.

(21) Appl. No.: 12/622,110

(22) Filed: Nov. 19, 2009

(65) Prior Publication Data

US 2011/0024252 A1 Feb. 3, 2011

(30) Foreign Application Priority Data

Jul. 28, 2009 (KR) ........................ 10-2009-0068803

(51) Int. Cl.
| | |
|---|---|
| *F16D 28/00* | (2006.01) |
| *H02K 7/06* | (2006.01) |
| *H02K 7/108* | (2006.01) |
| *H02K 7/116* | (2006.01) |

(52) U.S. Cl.
USPC .......... 192/20; 192/82 P; 192/84.6; 192/84.7; 192/90; 192/111.12; 310/83

(58) Field of Classification Search
USPC ..................... 192/20, 82 P, 111.12; 74/89.12
See application file for complete search history.

(56) References Cited

U.S. PATENT DOCUMENTS

| 5,934,432 A | * | 8/1999 | Bates .......................... 192/85.59 |
| 5,984,072 A | * | 11/1999 | Leimbach et al. ........ 192/111.12 |
| 2002/0088292 A1 | * | 7/2002 | Berger et al. .............. 74/473.12 |
| 2004/0200298 A1 | * | 10/2004 | Voelkert ......................... 74/22 R |
| 2005/0115792 A1 | * | 6/2005 | Geyer et al. ................ 192/111 B |

FOREIGN PATENT DOCUMENTS

| JP | 4-231727 A | 8/1992 |
| JP | 2003-278793 A | 10/2003 |
| JP | 2006-138428 A | 6/2006 |
| KR | 10-2001-0104374 A | 11/2001 |
| KR | 10-0688352 B1 | 2/2007 |
| KR | 10-2009-0040075 A | 4/2009 |
| WO | WO 2008/037513 A1 | 4/2008 |
| WO | WO 2008/131815 A1 | 11/2008 |

* cited by examiner

*Primary Examiner* — Rodney Bonck
(74) *Attorney, Agent, or Firm* — Morgan, Lewis & Bockius LLP

(57) ABSTRACT

A clutch actuating apparatus for a double clutch transmission, may include an electric unit that generates rotational force, a decelerating unit coupled to the electric unit and reducing the rotational force of the electric unit, a straight-converting unit that converts the rotational force reduced by the decelerating unit into a straight motion force, a push rod that is moved straight by the straight motion force of the straight-converting unit and makes an operational stroke to selectively engage a clutch, a supplement force supplying unit engaging with the push rod to increase the straight movement force to the push rod or to remove the increased straight movement force from the push rod when the push rod engages or disengages the clutch, and a rod locating unit coupled to the push rod and changing a relative position of the push rod to the straight-converting unit.

9 Claims, 5 Drawing Sheets

CLUTCH ACTUATING APPARATUS FOR TRANSMISSION

CROSS-REFERENCE TO RELATED APPLICATIONS

The present application claims priority to Korean Patent Application No. 10-2009-0068803 filed Jul. 28, 2009, the entire contents of which application is incorporated herein for all purposes by this reference.

BACKGROUND OF THE INVENTION

1. Field of the Invention

The present invention relates to a clutch actuating apparatus for a double clutch transmission, in detail, a technology about an actuator that respectively engages/disengages two clutches of a double clutch transmission.

2. Description of Related Art

Double clutch transmissions, different from a single clutch transmission systems of the related art, are shifting systems equipped with two clutches and designed to form separate shifting lines while one clutch connects/disconnects the gears of the odd-numbered states and the other clutch connects/disconnects the gears of the even-numbered states, which facilitate driving, such as automatic transmission, and achieve larger improvement of fuel efficiency than manual transmissions.

Further, double clutch transmissions allow for smooth shifting, because disconnection of acceleration, chattering and difference when gears are engaged, which are generated in transmissions equipped with a single clutch, do not occur.

The double clutch transmissions are provided with a preselect function that engages in advance a shift gear of a shift stage in a next desired shift line other than the present shift stage, and directly shift only by changing the operation of the two clutches.

That is, with shift stages of different two shift lines engaged, respectively, the transmission ratio outputted from the transmission is changed in accordance with which clutch of the two clutches is engaged.

As described above, a clutch actuating apparatus for engaging a clutch should engage a clutch while being mechanically moved by electric operation or hydraulic operation, such that sufficient force for engaging the clutch should be applied to an apply bearing and a function of compensating frictional wear is required to compensate increase of the operational stroke when the clutch is worn.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a clutch actuating apparatus for a double clutch transmission that makes it possible to engage a clutch using an electric device having a relatively small capacity, to supply sufficient force for engaging the clutch to an apply bearing, and to always stably and appropriately operate the clutch by automatically compensating the operational stroke that is generated when the clutch is worn. and to provide a clutch actuating apparatus for a double clutch transmission that is configured to use common clutch mechanism provided with a separate clutch lever as it is, in order to implement clutch mechanism of a double clutch transmission using various parts and general technologies in the related art, and has a simple and compact configuration to be easily mounted in a vehicle.

In an aspect of the present invention, the clutch actuating apparatus for a double clutch transmission, may include an electric unit that generates rotational force, a decelerating unit coupled to the electric unit and reducing the rotational force of the electric unit, a straight-converting unit that converts the rotational force reduced by the decelerating unit into a straight motion force, a push rod that is moved straight by the straight motion force of the straight-converting unit and makes an operational stroke to selectively engage a clutch, a supplement force supplying unit engaging with the push rod to increase the straight movement force to the push rod or to remove the increased straight movement force from the push rod when the push rod engages or disengages the clutch, and a rod locating unit coupled to the push rod and changing a relative position of the push rod to the straight-converting unit.

The electric unit may include an electric motor, the decelerating unit may includes a worm connected to a rotary shaft of the electric motor and a worm wheel engaged with the worm, wherein the worm wheel is rotatably coupled to a body housing, the straight-converting unit may include a driving pinion integrally formed with the worm wheel and a reciprocating member having a rack engaged with the driving pinion to convert a rotation of the driving pinion to a straight motion of the push rod, and the electric motor may be connected to and controlled by a controller that receives output shaft velocity information of the double clutch transmission.

The reciprocating member may be guided straight by at least a roller rotatably coupled to the body housing and rollably contacting with the reciprocating member, wherein the at least a roller is disposed away from the driving pinion in a predetermined distance.

The rod locating unit may include a rod block fixed to the reciprocating member and receiving the push rod therein to guide the push rod to slide straight, a compensating pinion rotatably coupled to the rod block and engaged with a rack of the push rod, and a clutch rotating unit that allows for one-way rotation of the compensating pinion by a predetermined angle in accordance with a straight motion of the rod block.

The clutch rotating unit may include a movable dog including a plurality of wedged teeth and coaxially connected with the compensating pinion, wherein the movable dog includes a plurality of locking steps formed at an angle in a predetermined direction at a predetermined distance along the outer circumference to perform the one-way rotation of the compensating pinion, and a locking lever that is pivotally coupled to the body housing and engaged with the locking steps of the movable dog to be selectively locked thereto such that the movable dog rotates in one-way direction at a predetermined angle when the rod block moves in a predetermined compensating section in a clutch-disengaged direction, and wherein the controller controls the electric motor such that the rod block moves straight in the predetermined compensating section.

A bias elastic member may be disposed between the locking lever and the body housing to elastically support the locking lever against the movable dog, and a fixed dog having a plurality of wedged teeth corresponding to the plurality of wedged teeth of the movable dog and engaged thereto to allow for one-way rotation of the movable dog while making a pair with the movable dog, may be fixed to the rod block.

The movable dog may be coaxially connected with the compensating pinion, through the fixed dog, wherein a return spring is disposed between the compensating pinion and the fixed dog.

The supplement force supplying unit may include a pressing slope that protrudes from a straight plane of the reciprocating member which is parallel with the straight movement direction of the reciprocating member, at an angle slanted away from the straight movement direction, a pressing roller contacting with the straight plane or the pressing slope while the reciprocating member moves straight, and a pressing elastic member coupled to the pressing roller and applying elastic force to the pressing roller to contact the pressing roller to the straight plane or the pressing slope.

The pressing elastic member may be aligned perpendicular to the straight plane.

The electric unit, the deceleration unit, the straight-converting unit, and the supplement force supplying unit may be disposed in a body housing, and the push rod may be disposed with a portion protruding outside through the body housing.

According to various aspects of the present invention, it is possible to engage a clutch using an electric device having a relatively small capacity, to supply sufficient force for engaging the clutch to an apply bearing, to ensure stable engagement of the clutch, and to always stably and appropriately operate the clutch by automatically compensating the operational stroke that is generated when the clutch is worn.

Further, the present invention is configured to use common clutch system components provided with a separate clutch lever as it is, in order to implement clutch mechanism of a double clutch transmission using various parts and general technologies, and has a simple and compact configuration to be easily mounted in a vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
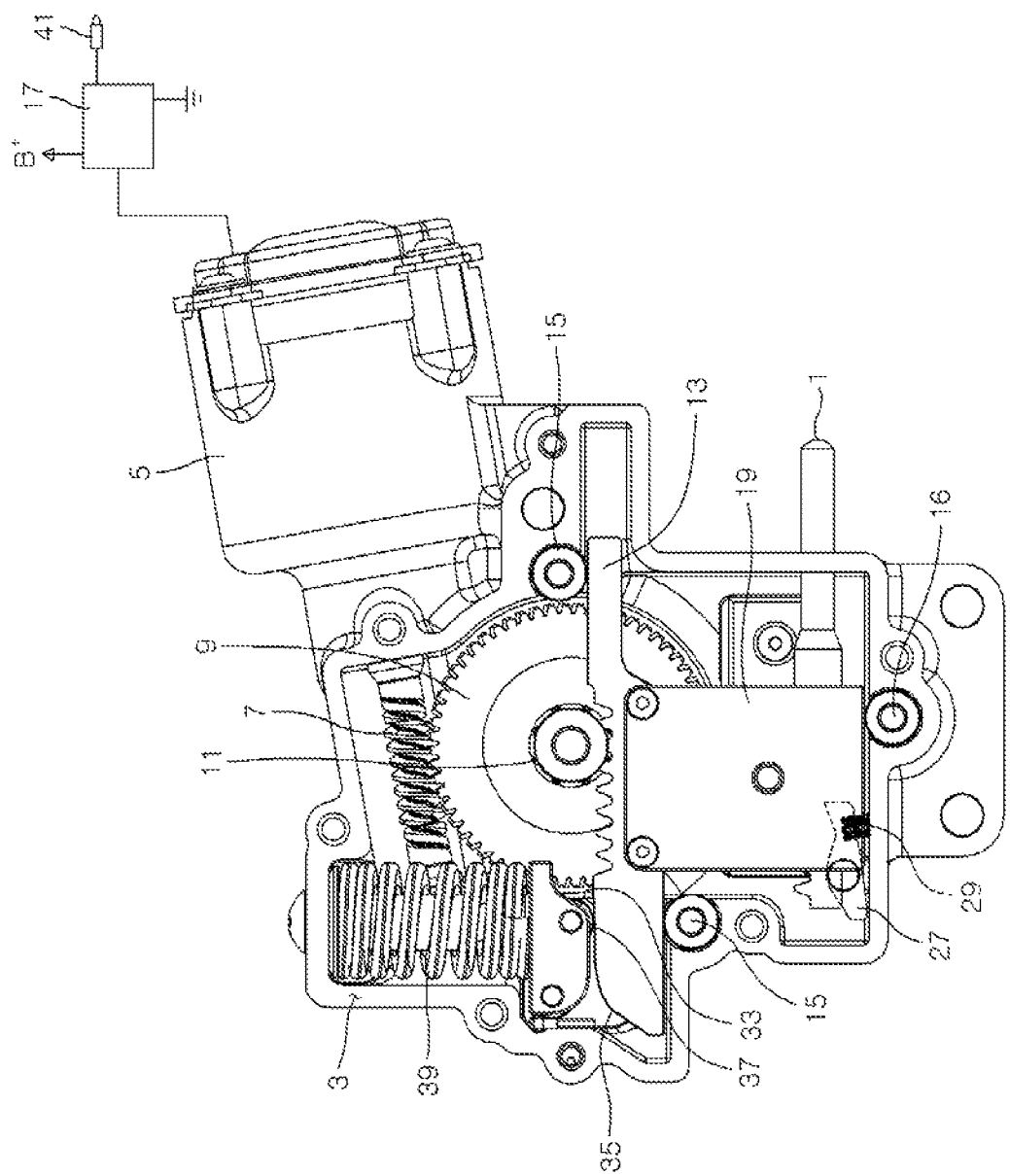
FIG. 1 is a view showing the configuration of a clutch actuating apparatus for a double clutch transmission according to an exemplary embodiment of the present invention.
Figure 2:
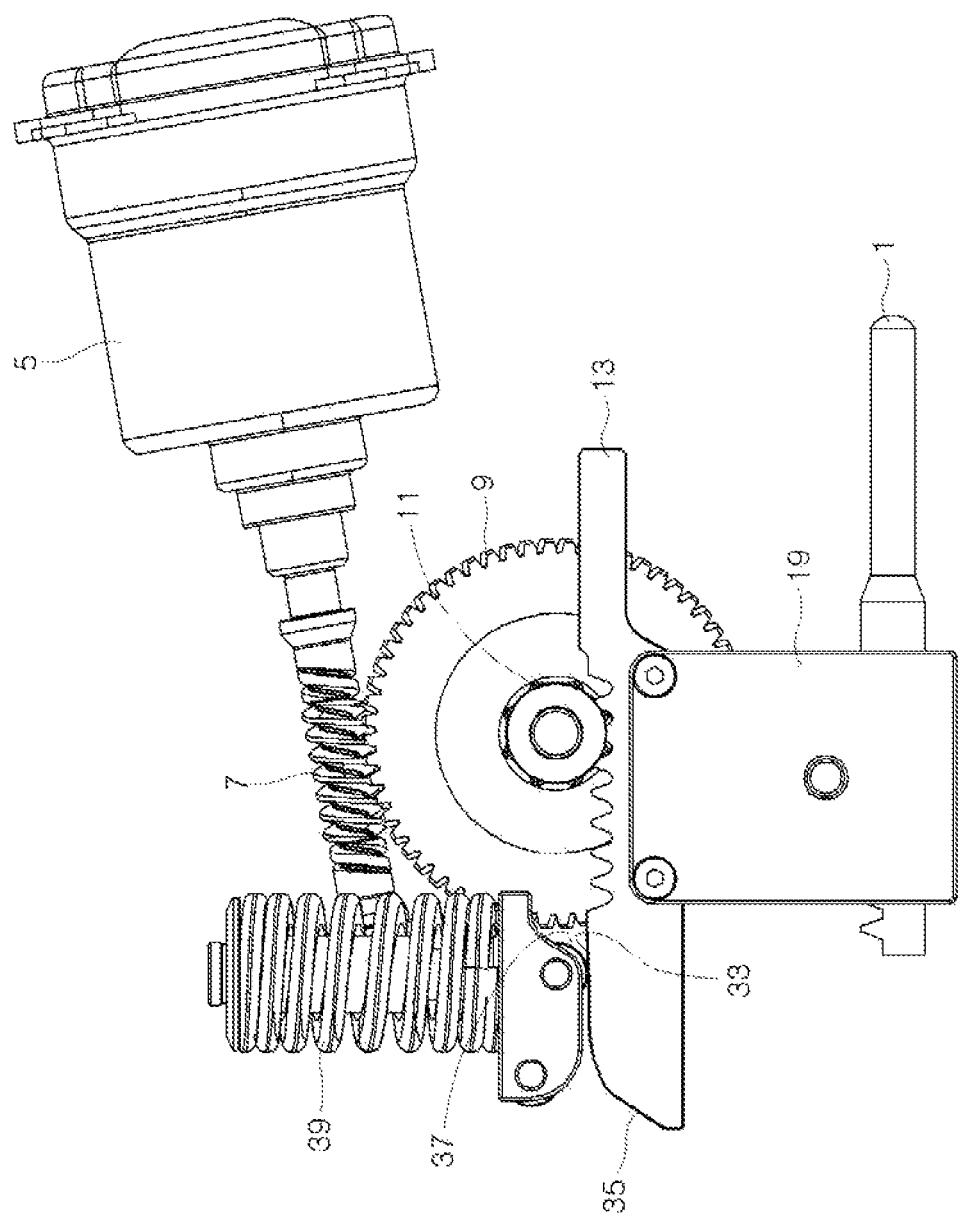
FIG. 2 is a view separately showing connection of main parts of FIG. 1.
Figure 3:
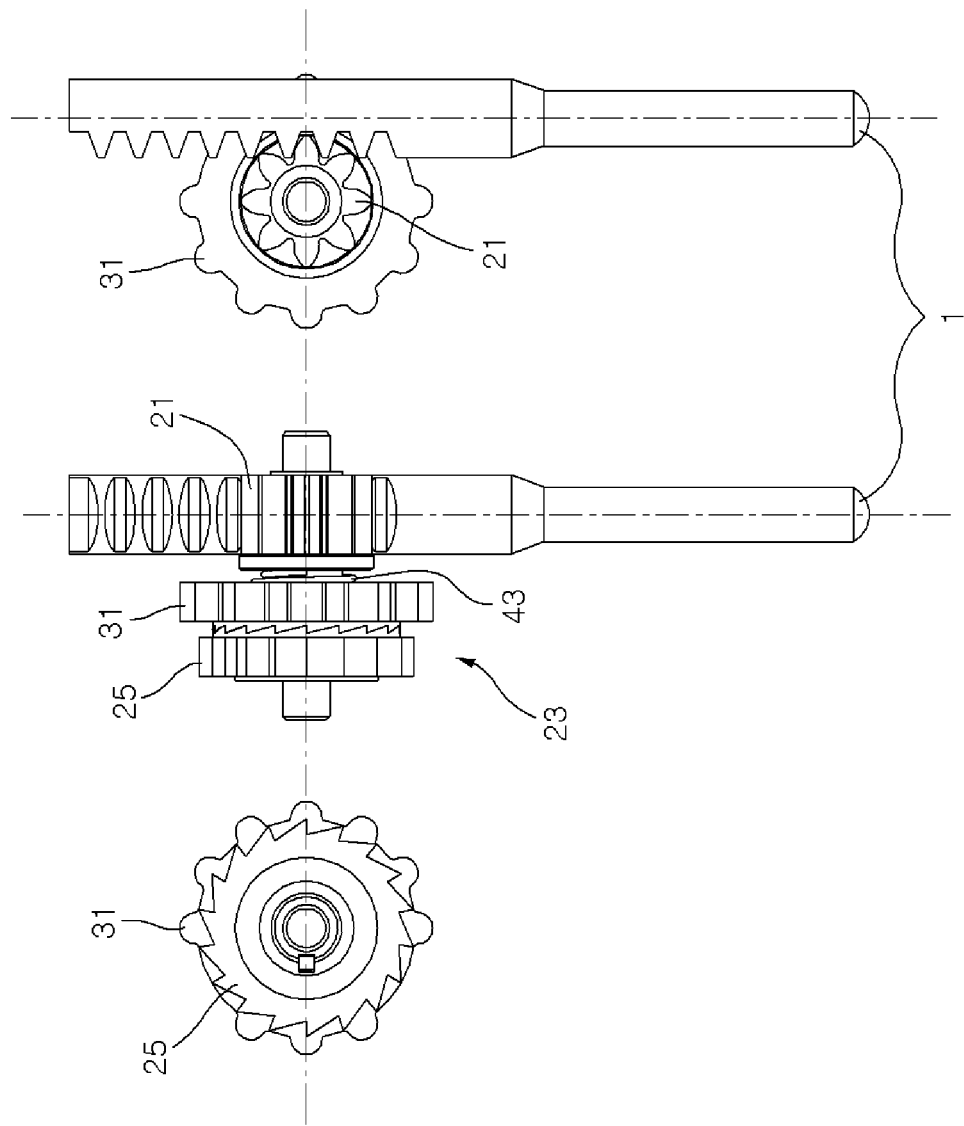
FIG. 3 is a view showing connection of the push rod, the compensating pinion, and the one-way clutch in the exemplary embodiment of FIG. 1.
Figure 4:
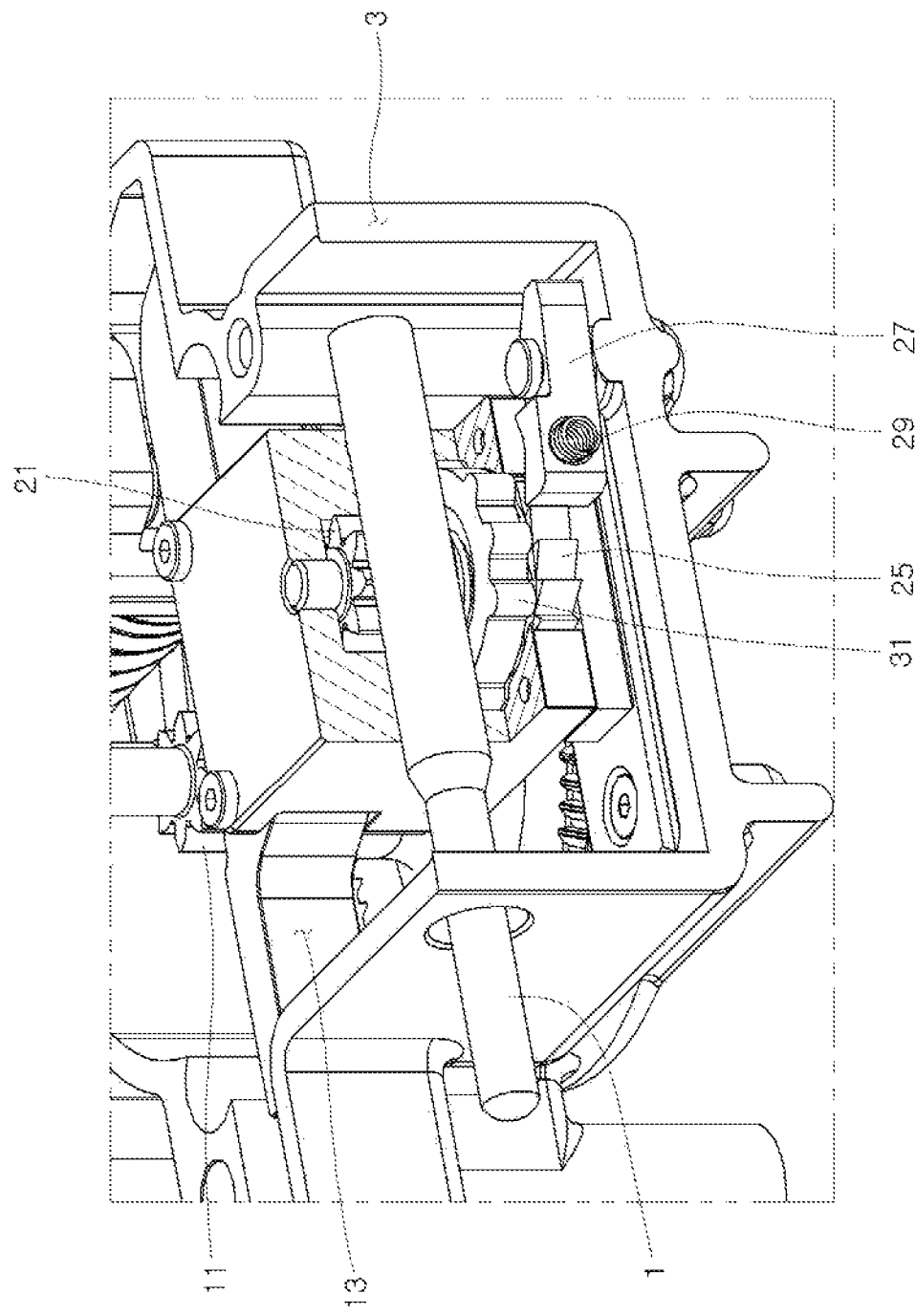
FIG. 4 is a view showing assembly of the push rod, the compensating pinion, and the one-way clutch through a portion of the rod block in the exemplary embodiment of FIG. 1.
Figure 5:
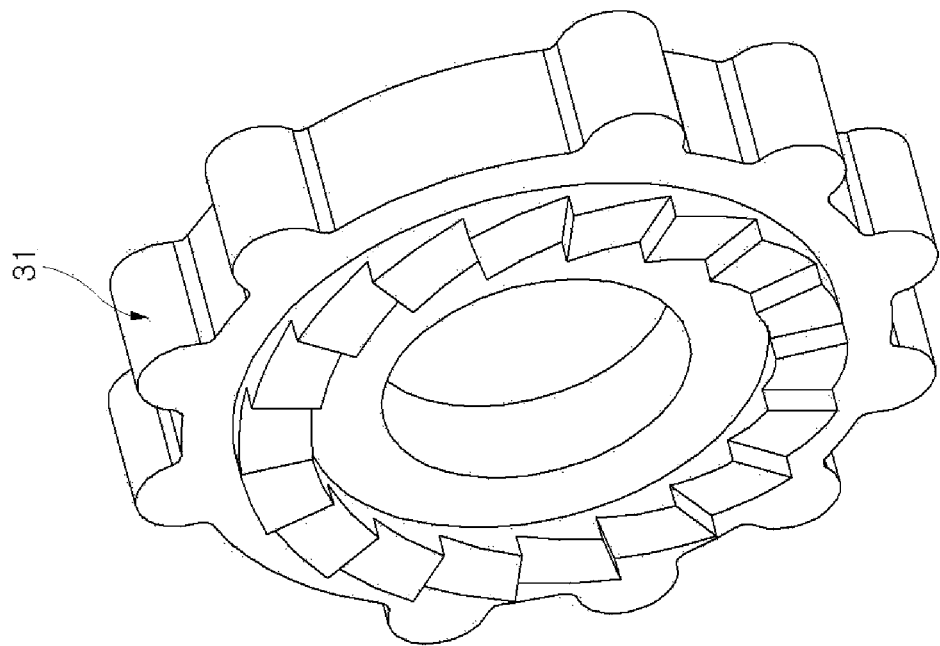
FIG. 5 is a view showing in detail the structure of the fixed dog and the movable dog in the exemplary embodiment of FIG. 1.
Figure 5:
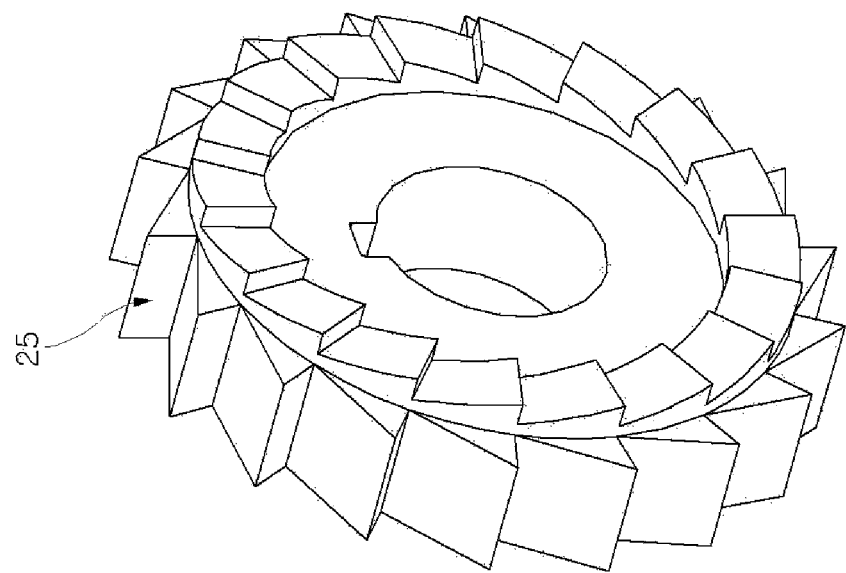

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 4, an exemplary embodiment of the present invention includes: an electric unit that generates rotational force; a decelerating unit that reduces the rotational force of the electric unit; a straight-converting unit that converts the rotational force reduced by the decelerating unit into a straight motion force; a push rod 1 that is moved straight by the straight-converting unit and makes an operational stroke to engage a clutch; a supplement force supplying unit that increases straight movement force or removes the increased straight movement force of push rod 1 when push rod 1 engages and disengages a clutch; and a rod locating unit that is provided to change relative position of push rod 1 to the straight-converting unit.

In this embodiment, the electric unit, deceleration unit, straight-converting unit, and supplement force supplying unit are disposed in a single body housing 3 and push rod 1 is disposed with a portion protruding outside through housing 3.

Housing 3 is mounted to a double clutch transmission to be able to move straight an apply bearing that engages/disengages the clutch by the straight motion of push rod 1 protruding as described above.

In this embodiment, the electric unit is implemented by an electric motor 5 and the decelerating unit includes a worm 7 connected to the rotary shaft of electric motor 5 and a worm wheel 9 engaged with worm 7.

That is, worm 7 is directly connected to the rotary shaft of electric motor 5 and rotated by electric motor 5 and worm wheel 9 engaged with worm 7 is decelerated by worm 7, thereby increasing torque from electric motor 5.

The straight-converting unit includes a driving pinion 11 integrally formed with worm wheel 9 and a reciprocating member 13 having a rack engaged with driving pinion 11.

Driving pinion 11 is formed integrally and coaxially with worm wheel 9 to rotate with worm wheel 9 and reciprocating member 13 is moved straight by rotation of driving pinion 11 because the rack is engaged with driving pinion 11, and idle rollers 15 are disposed in contact with reciprocating member 13 in housing 3 to guide the straight motion of reciprocating member 13.

Electric motor 5 is connected to and controlled by a controller 17 that receives output shaft velocity information of the double clutch transmission.

The rod locating unit includes: a rod block 19 that is fixed to reciprocating member 13 while guiding push rod 1 to slide straight; a one-way clutch 23 that has a compensating pinion 21 engaged with the rack of push rod 1 and is mounted to rod block 19 to rotate only in one direction; and a clutch rotating unit that rotates compensating pinion 21 of one-way clutch 23 by a predetermined angle in accordance with straight motion of rod block 19.

Rod block 19 is fixed to reciprocating member 13 to move straight together with reciprocating member 13 and supports push rod 1 such that push rod 1 can move straight relative to reciprocating member 13 and also rotatably supports compensating pinion 21, in which the straight movement direction of rod block 19 and reciprocating member 13 and the straight motion of push rod 1 relative to reciprocating member 13 are parallel with each other.

An idle roller 16 may be disposed in contact with the rod block 19 in housing 3 to guide the straight motion of the rod block 19.

The clutch rotating unit includes: a movable dog 25 that is coaxially connected with compensating pinion 21 and has a plurality of locking steps formed at an angle in a predetermined direction at a predetermined distance along the outer circumference and performs a rotational function of one-way clutch 23; a locking lever 27 that is fixed to housing 3 to be locked to the locking steps such that movable dog 25 rotates at a predetermined angle when rod block 19 moves in a predetermined compensating section in the clutch-disengaged direction; and controller 17 that controls electric motor 5 such that rod block 19 moves straight in the compensating section.

A bias elastic member 29 is disposed between locking lever 27 and housing 3 to elastically support locking lever 27 against movable dog 25.

A fixed dog 31 having a plurality of wedged teeth, which is engaged with each other on the surface facing movable dog 25 to allow for rotation of movable dog 25 in only one direction while making a pair with movable dog 25, is fixed to rod block 19.

That is, one-way clutch 23 includes movable dog 25 and fixed dog 31, in which a plurality of arc-shaped protrusions are formed around the outer surface of fixed dog 31 to prevent rotation when it is inserted in rod bock 19, such that movable dog 25 can rotate in only one direction with respect to rod block 19 without rotating in the other direction.

Alternatively, a spline, not the arc-shaped protrusions, may be formed on the outer surface of fixed dog 31 to be engaged with rod block 19.

Fixed dog 31 is fixed to and axially movable with respect to rod block 19 and a return spring 43 pushing fixed dog 31 against movable dog 25 is provided, such that when movable dog 25 rotates in the rotatable direction, fixed dog 31 axially moves while pressing return spring 43 to allow movable dog 25 to rotate, and in the other conditions, fixed dog 31 is pressed against movable dog 25 by force of return spring 43 to prevent movable dog 25 from rotating.

In this configuration, movable dog 25 is coaxially connected with compensating pinion 21, through fixed dog 31, and compensating pinion 21 engaged with push rod 1 and movable dog 25 locked to locking lever 27 are disposed in symmetric balance at both sides of movable dog 31 to achieve a more stable and durable configuration.

The supplement force supplying unit includes: a pressing slope 35 that protrudes from a straight plane of reciprocating member 13, which is parallel with the straight movement direction of reciprocating member 13, at an angle with respect to the straight movement direction; a pressing roller 37 that continuously contacts with straight plane 33 and pressing slope 35 while reciprocating member 13 moves straight; and a pressing elastic member 39 that applies elastic force, which is perpendicular to straight plane 33 of reciprocating member 13, to pressing roller 37.

That is, when reciprocating member 13 moves straight and pressing roller 37 moves from straight plane 33 of reciprocating member 13 and contacts with pressing slope 35, a component force acting in the straight movement direction of reciprocating member 13 is generated from the force, which is applied to reciprocating member 13 by pressing roller 37, by pressing slope 35 and added to the straight movement force supplied by electric motor 5, such that the straight movement force of push rod 1 is increased. On the contrary, when reciprocating member 13 returns and pressing roller 37 contacts with straight plane 33 of reciprocating member 13, the increased straight movement force that has been applied to push rod 1 is completely removed.

The operation of increasing the straight movement force of push rod 1 when pressing roller 37 contacts with pressing slope 35 makes it possible to minimally use the electromotive force for electric motor and maintain stable stop position of push rod 1 while the clutch maintains the engagement, such that stable engagement of the clutch can be ensured.

Meanwhile, the sum of the straight movement force of push rod 1 supplied from electric motor 5 and the straight movement force of the supplement force supplying unit maintains the stable engagement of the clutch; however, when the force supplied from electric motor 5 is stopped by an error of the power device of a vehicle and only the force of the supplement force supplying unit is provided, the clutch is disengaged and the power transmission is stopped in the vehicle, thereby ensuring stability of the vehicle.

The operation of an exemplary embodiment having the above configuration according to the present invention is described hereafter.

In order to engage the clutch, controller 17 supplies power to electric motor 5 to rotate worm 7, worm wheel 9 and driving pinion 11 correspondingly rotate.

As driving pinion 11 rotates, reciprocating member 13 moves to the right in FIG. 1 and rod block 19 fixed to reciprocating member 13 and push rod 1 correspondingly move straight, such that push rod 1 moves straight the apply bearing and the clutch is engaged.

In this operation, as the movement distance of reciprocating member 13 increases, pressing roller 37 contacts with pressing slope 35 and provides the elastic force of pressing elastic member 39 in the straight movement direction of reciprocating member 13.

When the clutch is engaged, the engagement of the clutch is stably maintained by the force provided by pressing elastic member 39 while the electromotive force provided for electric motor 5 is minimally maintained. In this condition, when the electricity provided for electric motor 5 is stopped, the force applied to push rod 1 is reduced and the clutch is correspondingly disengaged and power is cut, such that it is possible to ensure safety of the vehicle even if the power device of the vehicle is suddenly broken.

In order to disengage the clutch, as controller 17 reverses electric motor 5, reciprocating member 13 returns to the left and pressing roller 37 is lifted along pressing slope 35 and contacts with straight plane 33 of reciprocating member 13.

Accordingly, push rod 1 returns and the apply bearing correspondingly returns, such that the clutch is disengaged.

While the clutch is repeatedly engaged and disengaged as described above, the clutch is worn and the frictional wear should be appropriately compensated. Accordingly, controller 17 receives output shaft velocity information of the double clutch transmission from a velocity sensor 41 and compensates the frictional wear of the clutch using the rod locating unit.

That is, controller 17 drives electric motor 5 to engage the clutch and then monitors the timing of change in the output shaft velocity of the double clutch transmission, in which when an expected change in the output shaft velocity is delayed over a predetermined level, controller 17 determines that the delay is due to frictional wear of the clutch, such that it operates the rod locating unit.

Assuming that straight movement section that is defined when rod block 19 further returns in the return direction from the return point after moving to engage the clutch is a compensation section, when controller 17 controls electric motor 5 such that rod block 19 moves straight along the compensation section, the locking step of movable dog 25 is locked to locking lever 27 by the movement of rod block 19 and movable dog 25 rotates. Accordingly, compensating pinion 21 further protrudes push rod 1 from rod block 19 while being rotated by the rotation of movable dog 25, such that the frictional wear of the clutch is compensated.

Once movable dog 25 rotates as described above, it is fixed not to rotate reversely with respect to fixed dog 31, such that protruding push rod 1 can be stably maintained.

Further, when rod block 19 returns to the initial position after moving along the compensation section, locking lever 27 is elastically supported to movable dog 25 such that it can be locked to the next locking step of movable dog 25 by bias elastic member 29.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch actuating apparatus for a transmission, comprising:
   an electric unit that generates rotational force;
   a decelerating unit coupled to the electric unit and increasing the rotational force of the electric unit;
   a straight-converting unit that converts the rotational force increased by the decelerating unit into a straight motion force;
   a push rod that is moved straight by the straight motion force of the straight-converting unit and makes an operational stroke to selectively engage a clutch;
   a supplement force supplying unit engaging with the push rod to increase the straight movement force to the push rod or to remove the increased straight movement force from the push rod when the push rod engages or disengages the clutch; and
   a rod locating unit coupled to the push rod and changing a relative position of the push rod to the straight-converting unit;
   wherein the electric unit includes an electric motor, the decelerating unit includes a worm connected to a rotary shaft of the electric motor and a worm wheel engaged with the worm, wherein the worm wheel is rotatably coupled to a body housing, the straight-converting unit includes a driving pinion integrally formed with the worm wheel and a reciprocating member having a rack engaged with the driving pinion to convert a rotation of the driving pinion to a straight motion of the push rod, and the electric motor is connected to and controlled by a controller that receives output shaft velocity information of the transmission, and
   wherein the rod locating unit includes:
   a rod block fixed to the reciprocating member and receiving the push rod therein to guide the push rod to slide straight;
   a compensating pinion rotatably coupled to the rod block and engaged with a rack of the push rod; and
   a clutch rotating unit that allows for one-way rotation of the compensating pinion by a predetermined angle in accordance with a straight motion of the rod block.

2. The clutch actuating apparatus for the transmission as defined in claim 1, wherein the reciprocating member is guided straight by at least a roller rotatably coupled to the body housing and rollably contacting with the reciprocating member, wherein the at least a roller is disposed away from the driving pinion in a predetermined distance.

3. The clutch actuating apparatus for the transmission as defined in claim 1, wherein the clutch rotating unit includes:
   a movable dog including a plurality of wedged teeth and coaxially connected with the compensating pinion, wherein the movable dog includes a plurality of locking steps formed at an angle in a predetermined direction at a predetermined distance along the outer circumference to perform the one-way rotation of the compensating pinion; and
   a locking lever that is pivotally coupled to the body housing and engaged with the locking steps of the movable dog to be selectively locked thereto such that the movable dog rotates in one-way direction at a predetermined angle when the rod block moves in a predetermined compensating section in a clutch-disengaged direction.

4. The clutch actuating apparatus for the transmission as defined in claim 3, wherein a bias elastic member is disposed between the locking lever and the body housing to elastically support the locking lever against the movable dog, and
   a fixed dog having a plurality of wedged teeth corresponding to the plurality of wedged teeth of the movable dog and engaged thereto to allow for one-way rotation of the movable dog.

5. The clutch actuating apparatus for the transmission as defined in claim 4, wherein the movable dog is coaxially connected with the compensating pinion, through the fixed dog.

6. The clutch actuating apparatus for the transmission as defined in claim 5, wherein a return spring is disposed between the compensating pinion and the fixed dog.

7. The clutch actuating apparatus for the transmission as defined in claim 1, wherein the supplement force supplying unit includes:
   a pressing slope that protrudes from a straight plane of the reciprocating member which is parallel with the straight movement direction of the reciprocating member, at an angle slanted away from the straight movement direction;
   a pressing roller contacting with the straight plane or the pressing slope while the reciprocating member moves straight; and
   a pressing elastic member coupled to the pressing roller and applying elastic force to the pressing roller to contact the pressing roller to the straight plane or the pressing slope.

8. The clutch actuating apparatus for the transmission as defined in claim 7, wherein the pressing elastic member is aligned perpendicular to the straight plane.

9. The clutch actuating apparatus for the transmission as defined in claim 1, wherein the electric unit, the deceleration unit, the straight-converting unit, and the supplement force supplying unit are disposed in a body housing, and the push rod is disposed with a portion protruding outside through the body housing.

* * * * *